(No Model.)

J. W. DUDLEY.
PISTON PACKING.

No. 353,211. Patented Nov. 23, 1886.

WITNESSES:
Donn Twitchell
C. Sedgwick

INVENTOR:
J. W. Dudley
BY Munn & Co.
ATTORNEYS.

UNITED STATES PATENT OFFICE.

JOHN W. DUDLEY, OF PORTLAND, OREGON.

PISTON-PACKING.

SPECIFICATION forming part of Letters Patent No. 353,211, dated November 23, 1886.

Application filed April 23, 1886. Serial No. 199,937. (No model.)

*To all whom it may concern:*

Be it known that I, JOHN W. DUDLEY, of Portland, in the county of Multnomah and State of Oregon, have invented a new and Improved Piston-Packing, of which the following is a full, clear, and exact description.

My invention relates to packings for pistons of the cylinders of hydraulic, steam, and other machinery, and has for its object to provide a simple, inexpensive, durable, and efficient packing, which may readily be tightened against the wall of the cylinder in which the piston works, and will have an elastic or yielding bearing thereon, and a close fit with minimum friction in the cylinder.

The invention consists in certain novel features of construction and combinations of parts of the piston-packing, all as hereinafter fully described and claimed.

Reference is to be had to the accompanying drawings, forming a part of this specification, in which similar letters of reference indicate corresponding parts in both the figures.

Figure 1:
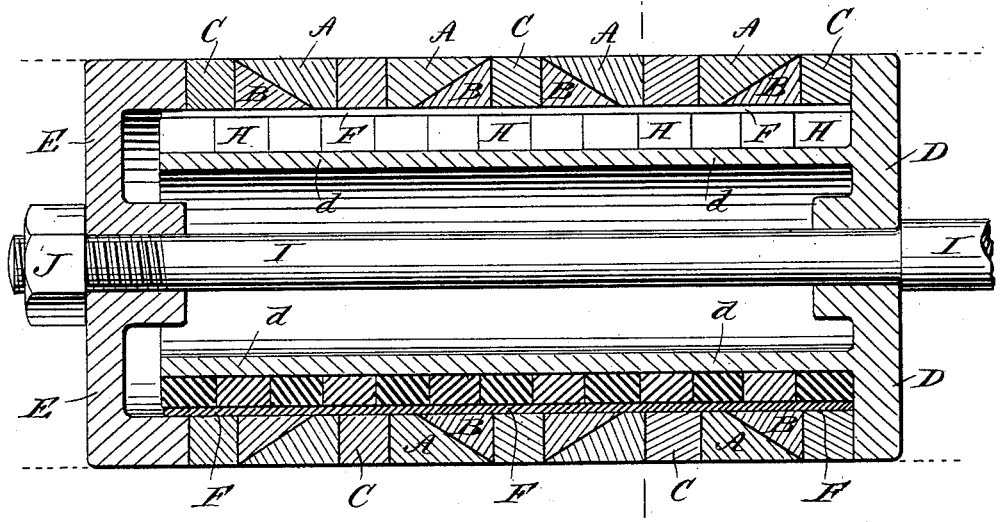
Figure 2:
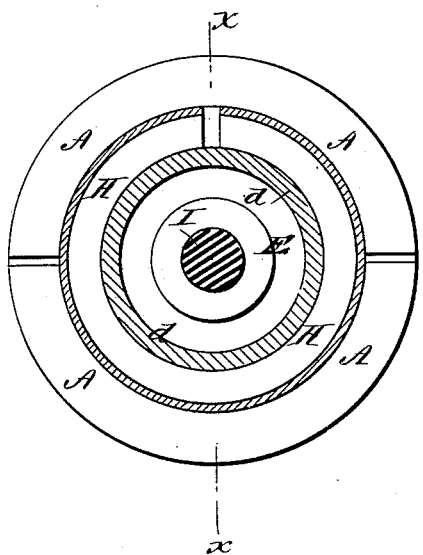

Figure 1 is a longitudinal sectional elevation of my improved piston-packing, taken on the line $x\ x$, Fig. 2; and Fig. 2 is a transverse sectional elevation thereof, taken on the line $y\ y$, Fig. 1.

The drawings, Fig. 1, represent a long piston, requiring a correspondingly long packing. Consequently there are shown four sets of split metallic packing-rings, A B, having diagonal meeting faces, and five split metallic rings, C, placed between the ends of the packing-rings A B and next the fixed and the movable heads D E of the piston. The inner and outer faces of the packing-rings A B C are in alignment lengthwise of the piston, and inside of the rings there is placed a split metallic sleeve, F, between which and the long collar $d$, fast to the fixed head D of the piston, there are placed a series of rubber rings, H. These rings H are preferably split rings, as shown in Fig. 2 of the drawings; but they may be whole or split, and may be of any suitable elastic substance which may be a fibrous or other material.

The piston-rod I is passed through the head D, within the collar $d$, and through the head or follower E, and receives a nut, J, outside of the head E, which nut may be screwed along the rod to force the head E inward, and tighten the packing against the wall of the cylinder in which the piston works. The metallic sleeve F holds the packing-rings A B C straight or in line for the entire length of the packing, and the rubber or elastic rings or packing H presses the sleeve F outward to give proper even contact of the packing-rings A B C against the wall of the cylinder in which the piston works, and insures a fluid-tight joint of the piston in the cylinder with little friction.

There may be any required number of the packing-rings, according to the length of the piston, and for thin pistons, where but one pair of rings, A B, are used, the heads D E will serve the purpose of the compressing-rings C, which then may be dispensed with, and in thin pistons the sleeve F also may at times be dispensed with, and the rings A B will then be placed directly over the elastic packing H.

This packing is specially adapted for use on long pistons or plungers subjected to heavy pressures, as in hydraulic or steam machinery.

Having thus fully described my invention, I claim as new and desire to secure by Letters Patent—

1. A piston-packing comprising bevel-faced split metallic rings held between opposite fixed and movable heads of the piston, and an elastic packing placed within the said rings and tending to force them outward, substantially as herein set forth.

2. A piston-packing comprising bevel-faced split metallic rings A B, held between opposite fixed and movable heads of the piston, and an elastic packing, as at H, placed within the rings A B and over a collar fixed to one of the piston-heads, substantially as herein set forth.

3. A piston-packing comprising bevel-faced split metallic rings A B, held between opposite fixed and movable heads of the piston, an elastic packing, H, held over a collar fixed to one of the piston-heads, and a metallic sleeve, F, interposed between the rings A B and the packing H, substantially as and for the purposes herein set forth.

4. A piston-packing comprising bevel-faced split metallic rings A B, held between opposite heads of the piston, metallic spacing and packing rings C, placed between the sets of rings A B, and an elastic packing, H, interposed between the rings A B C, and a collar fixed to one of the piston-heads, substantially as herein set forth.

5. A piston-packing comprising bevel-faced split metallic rings A B, metallic spacing and packing rings C, placed between the sets of rings A B, an elastic packing, H, held over a collar fixed to one of the piston-heads, and a metallic sleeve, F, interposed between the packing-rings A B C and the elastic packing H, substantially as herein set forth.

JOHN W. DUDLEY.

Witnesses:
GEORGE G. GAMMANS,
WILLIAM L. DUDLEY.